Feb. 17, 1931.   L. W. HANDWERKER   1,792,836
HYDRAULIC VALVE MECHANISM
Filed March 1, 1928
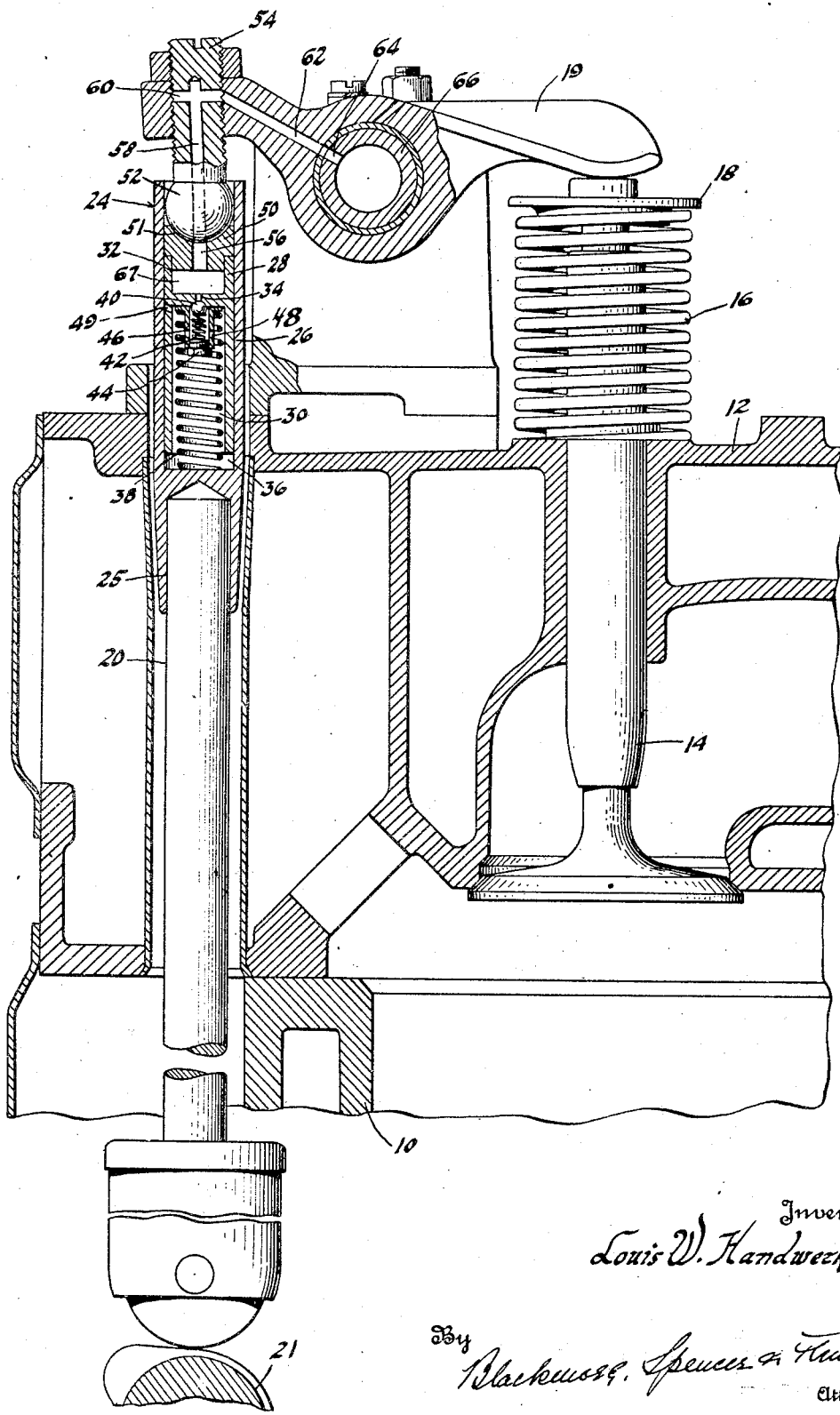
Inventor
Louis W. Handwerker
By Blackmore, Spencer & Hulh
Attorneys Patented Feb. 17, 1931

1,792,836

UNITED STATES PATENT OFFICE

LOUIS W. HANDWERKER, OF DETROIT, MICHIGAN, ASSIGNOR TO GENERAL MOTORS RESEARCH CORPORATION, OF DETROIT, MICHIGAN, A CORPORATION OF DELAWARE

HYDRAULIC VALVE MECHANISM

Application filed March 1, 1928. Serial No. 258,324.

This invention relates to hydraulic mechanism for taking up the slack or clearance in valve gear employed on internal combustion engines, so that the gear will operate noiselessly at all times. As is well known, in ordinary valve gear some slack or clearance must be provided when the parts are cold so that the gear will not bind and hold the valve off its seat when the parts expand as a result of heating. This clearance renders the gear noisy when the engine is cold. It is likewise a difficult matter to adjust the valves to provide exactly the right amount of clearance so that, as a practical matter, the gear is more or less noisy under all conditions.

My form of apparatus is of the so-called slack adjusting type, that is, it involves an hydraulic chamber carried by one moving part and containing a body of oil or other fluid supporting a plunger carried by another moving part. Provision is made for replenishing the oil in the hydraulic chamber, this consisting preferably of a connection with a reservoir which in turn may be supplied from the usual pressure lubricating system, the connection being controlled by a suitable one way valve to prevent escape of oil during the operating stroke of the gear. My invention is shown embodied in overhead valve mechanism. In this embodiment the hydraulic chamber is preferably formed in the upper end of the push rod. Oil is supplied to the hydraulic chamber from the rocker arm shaft, which is normally filled with oil under pressure for the lubrication of the rocker arm bearings. Passages are provided in the rocker arm and in the ball and socket connection of the rocker arm and push rod, these passages leading to a filler chamber provided in the upper end of the plunger fitted in the hydraulic chamber. A check valve controls communication between the filler chamber and the hydraulic chamber beneath the plunger.

I have made special provision for relieving the plunger of the side thrust to which it would be subjected as a result of rocker arm motion. Normally this side thrust would tend to produce wear between the plunger and the cylinder in which it slides and cause leakage of oil from the hydraulic chamber causing the apparatus to cease to function. I have eliminated side thrust by making the ball carried by the rocker arm and supported by the plunger an accurate fit in the cylinder so that the cylinder directly receives the side thrust. The fit between the ball and the cylinder also forms a second seal in series with the seal between the plunger and cylinder and assists in preventing the escape of oil.

My invention is capable of considerable modification as will be pointed out in the course of the following description.

The figure is a section through the overhead valve mechanism of an internal combustion engine, embodying the features of my invention.

10 indicates a portion of the cylinder of the engine, and 12, the cylinder head. 14 indicates a conventional poppet valve normally held upon its seat by a spring 16 engaging a collar 18 carried by the stem. 19 indicates a rocker arm, one end of which engages the end of the valve stem and the other end the upper end of the valve tappet 20. 21 indicates a portion of the usual motor driven cam shaft for operating the tappet.

My hydraulic mechanism is embodied in a fitting 24 secured to the upper end of the tappet. The fitting 24 is provided with a bore 25 to receive the main body of the tappet but any preferred detachable or rigid connection may be employed and in some cases an integral construction may be found most satisfactory. The upper end of the fitting 24 is bored to form a cylinder 26, within which is fitted a plunger indicated as an entirety by the reference character 28. The plunger is provided with a lower bore 30 and an upper bore 32 connected by passage 34. The lower bore 30 forms in conjunction with the cylinder 26 an hydraulic chamber 36, in which spring 38 is received. The passage 34 is controlled by check valve 40 normally urged against its seat by a light coil spring 42, reacting against plug 44 closing the end of the valve chamber 46. I have illustrated a check valve of the ball type but a poppet type valve may be substituted if preferred.

The orifice 48 in the wall of the chamber 46 constitutes a portion of the passage 34. Any other suitable arrangement of passages may be employed as will be found best in practice. The wall of plunger 28 is apertured at 49 to permit the escape of air from the upper portion of the hydraulic chamber. Such air finds its way out between the plunger and cylinder. In the upper bore 32 is fitted a hardened steel plug 50 having a ground seat 51 for receiving the ball 52 carried by or formed on stud 54 mounted in the rocker arm. The plug 50 is apertured at 56 and with this aperture communicates passage 58 formed in the stud 54. The stud 54 is provided with a counter bore 60 intersecting the passage 58. With the counter bore communicates passage 62 drilled in the rocker arm, and this communicates with bore 64 formed in the hollow rocker shaft 66. These passages may be so arranged that the bores in the rocker shaft and in the rocker communicate only at certain positions of the rocker so that the feed of oil to the hydraulic mechanism is intermittent.

It will be noted that the plug 50 is spaced from the bottom of the bore 32 in the plunger 28 forming a reservoir 67 for supplying oil to the hydraulic chamber 36. This provides a reserve supply in case of interruption of flow from the rocker shaft.

Attention is particularly called to the fact that the ball 52 is a close fit in the cylinder 26. Not only does this afford a second seal for the oil in the cylinder in series with the seal between the walls of the plunger 28 and the cylinder but it also serves as a means for retransmitting side thrust directly from the rocker to the tappet, relieving the plunger of this pressure and assuring longer life and tighter fit of the plunger in the cylinder.

The device operates as follows:

The hydraulic chamber 36 is normally filled with oil. As the engine warms up and the parts expand pressure is applied to the oil causing some of it to escape between the plunger 28 and the cylinder 26. Any air which may find its way into the chamber will find egress in the same manner. Should the parts cool and contract, the oil in the chamber will be relieved of pressure and during the non-operating portions of the valve cycle the spring 38 will force the plunger upwardly producing a partial vacuum or low pressure in the hydraulic chamber which will cause oil to flow into the chamber from the reservoir 67 past the check valve 40. As the reservoir is in communication with the interior of the rocker shaft which in turn is supplied with oil from the pressure lubricating system, it is obvious that the oil in the reservoir 67 is under pressure amounting to about 8 or 10 pounds per square inch so that upon any reduction in the pressure in the hydraulic chamber below that amount oil will be forced therein. By this means the increased clearance resulting from cooling of the parts is taken up. Should the oil supply fail entirely and the hydraulic chamber become short of oil, the valve mechanism will nevertheless operate by contact of the plunger 28 with the bottom of the cylinder 26.

It will be noted that oil is at all times supplied to the surfaces with which the ball 52 contacts. This oil film assists to some extent in reducing noise at these points.

It is obvious that my hydraulic mechanism may be supplied with oil from some other source than the lubricating system and that some other fluid may be employed. The mechanism may be used at some other point in the gear than that shown, for example between the other end of the rocker and the valve stem, or between parts of the push rod. It is adaptable to engines having side valves and engines having rockers constituting levers of another class than that illustrated. However the preferred embodiment of my invention is that shown on the drawings. It is a simple construction; receives its oil supply from the existing lubricating system without complication; is designed to relieve the hydraulic mechanism of all side thrust, reducing wear; and is cheap to manufacture.

I claim:

1. In valve gear, the combinaton of a pivoted member, a cooperating reciprocating member, a slack adjuster incorporated in one of said members and embodying a cylinder, a plunger in the cylinder supporting the other member, and means for transmitting side thrust from the pivoted member to the reciprocated member independently of said plunger.

2. The combination of a rocker, a push rod, a socket in the upper end of the push rod, a plunger fitted in the socket, a body of fluid in the socket on which the plunger rests, said rocker arm being provided with a portion supported by said plunger, and means for transmitting side thrust from said rocker arm to said push rod independently of said plunger, said means comprising a spherical member carried by the rocker arm and fitting in said cylinder.

3. The combination of a rocker arm provided with a spherical lug, a reciprocating member provided with a cylinder, a plunger in the cylinder having a spherical seat to receive the spherical lug, means for urging the plunger outwardly of the cylinder to take up slack in the system, said lug closely fitting within the cylinder so as to directly transmit side thrust to the cylinder walls independently of the plunger.

4. The combination of a rocker arm provided with a spherical lug, a reciprocating member provided with a cylinder, a plunger in the cylinder having a spherical seat to receive the spherical lug, means for urging the plunger outwardly of the cylinder to take up slack in the system, said lug closely fitting within the cylinder so as to directly transmit side thrust to the cylinder walls independently of the plunger, and a body of oil in said cylinder.

5. The combination of a pivoted shaft through which lubricant is circulated, a rocker arm pivoted on the shaft, a push rod provided at its upper end with a cylinder, a plunger in the cylinder supporting the rocker arm, a body of lubricant in the cylinder for supporting the piston, and passages for leading lubricant from the hollow pivot shaft through the rocker arm, and plunger to the body of lubricant, said rocker arm being provided with a spherical end fitting in said cylinder.

6. In valve gear for engines the combination of a rocker member, a reciprocating member, and a hydraulic slack adjuster for transmitting motion from one member to the other comprising a guide associated with one of the members, a plunger in the guide, a body of fluid in the guide for holding the plunger in adjusted position, a socket in the outer end of the plunger and a ball carried by and connected to the other member seated in the socket and closely fitting the guide so as to transmit lateral thrust thereto.

In testimony whereof I affix my signature.

LOUIS W. HANDWERKER.